June 26, 1951      E. J. TUTTLE      2,558,633
WORK FEEDING DEVICE
Filed Nov. 4, 1948
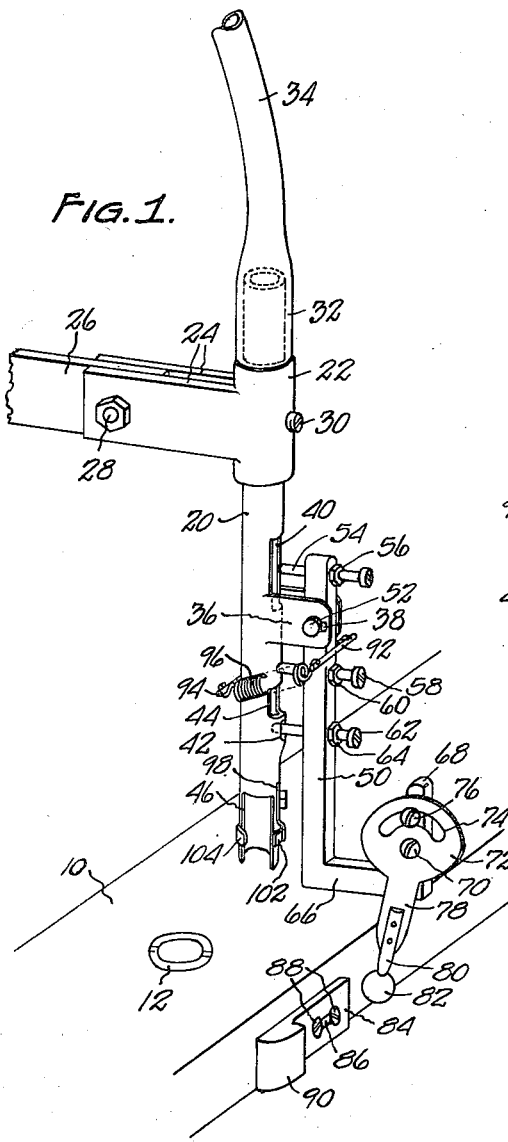
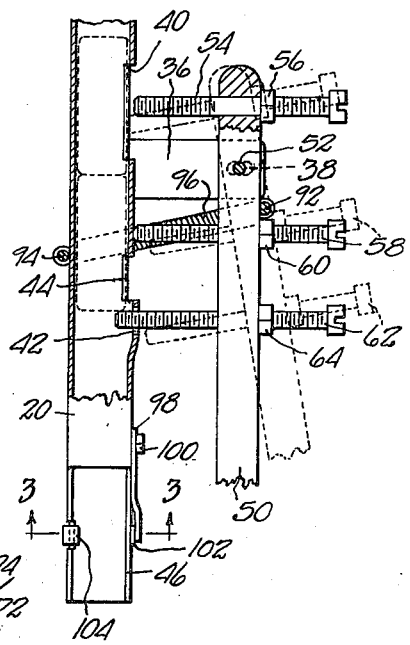
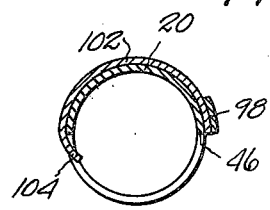
ELMER J. TUTTLE.
INVENTOR.
BY Oltsch + Knoblock
ATTORNEYS.

Patented June 26, 1951

2,558,633

UNITED STATES PATENT OFFICE 2,558,633

WORK FEEDING DEVICE

Elmer J. Tuttle, Osceola, Ind.

Application November 4, 1948, Serial No. 58,221

5 Claims. (Cl. 198—26)

This invention relates to improvements in work feeding devices. Certain types of machine tools, such as broaches, which have a high capacity and are adapted for machining small parts in large quantities at a rapid rate in mass production, are equipped with conveyors mounting chucks into which the work-pieces are inserted at a feeding station to be carried to a machining station. The operation of feeding a device of this character commonly is conducted by hand and is very tedious work for a machine operator. One type of machine, for example, is provided with a conveyor in which two rows of chucks are mounted at regular intervals, which conveyor travels at a high rate of speed so that at least 24 chucks in each of the two rows pass the feeding station each minute. This necessitates the handling of 48 work-pieces per minute by the operator to feed the machine to its full capacity. The regularity of the movement of the conveyor and of the movement of the chucks past the feeding station requires a high degree of concentration and the constant viewing of the moving conveyor parts, which tends to produce eye fatigue and frequently causes the operator to become dizzy or light headed.

The primary object of this invention is to provide a device which will permit the feeding of work-pieces mechanically to a machine of this character, thereby saving labor and permitting an operator to take care of a group or bank of machines and eliminating the tedious, confining and unhealthful conditions which operators of machines of this charatcer now experience.

A further object is to provide a device of this character which is adapted to be adjustable within a predetermined range to permit the feeding of work-pieces of different sizes by simple adjustment readily effected.

A further object is to provide a device of this character having a spring controlled positioning member so located and arranged that the work-piece is maintained in feeding position without danger of breakage thereof or of the feeding device in the event the device fails to function perfectly.

A further object of the invention is to provide a device of this character having a tubular discharge member terminating adjacent to a conveyor and provided with a lateral discharge opening partially spanned by a spring which is adapted to prevent the release of the work-piece upon engagement with the conveyor until such time as the work-piece is deposited in a chuck or work holder carried by the conveyor.

A further object is to provide a device of this character having means for discharging work-pieces to a discharge position, one by one, under the control of a member having a combined pivotal and floating movement and actuated by abutment with the conveyor carrying the work holders or chucks into which the work-pieces are to be discharged by the device and also carrying an actuating cam engaged by said member.

Other objects will be apparent from the following specification.

In the drawing:

Fig. 1 is a perspective view of the device, illustrating in outline a chuck holding machine conveyer with which it is associated.

Fig. 2 is an enlarged fragmentary axial sectional view of the device illustrating one operative position thereof in dotted lines.

Fig. 3 is a transverse sectional view taken on line 3—3 of Fig. 2.

Referring to the drawing which illustrates the preferred embodiment of the invention, the numeral 10 designates a conveyor which is shown in outline and which may be of any suitable construction. In the preferred embodiment, this conveyor will be formed of a link belt or similar mechanism trained around suitable pulleys (not shown) and leading from a feeding station to a working station of a machine tool, such as a broach (not shown). This conveyor 10 will be provided with a plurality of work holding chucks illustrated in outline at 12 and which are of any suitable type of construction. The chucks will preferably be arranged in longitudinal alignment and substantially equally spaced. If desired, two or more rows of chucks may be carried by the conveyor 10. The chucks will be of any suitable construction adapted to be operated mechanically between open position and closed position by suitable means (not shown) preferably located alongside the path of travel of the conveyor so that the chucks will be open at a predetermined point in that path of travel and will be held open until they reach a second predetermined point, whereupon they are closed and thereafter held closed until the first point is again reached or until some other predetermined opening station is reached.

I locate one of my improved work feeding devices above the path of travel of the chucks in each row. Thus, if the conveyor 10 carries only one row of chucks, only one work feeding device is employed, but if two or more rows of chucks are carried by the conveyor, then a number of feeding devices equal to the number of rows will be employed. Each of the work feeding devices comprises an elongated tubular body 20 whose upper end portion is encircled by a sleeve 22 forming a part of a rigid bracket. This bracket preferably has a pair of laterally projecting arms 24 by means of which the bracket is secured to a member 26 carried by the machine tool or by any other suitable support, said bracket arms 24 being fixedly secured to the part 26 as by one or more bolts or other securing members 28. The sleeve 22 is preferably provided with an aperture screw-threaded to receive a set screw 30 whose inner end bears against the tube 20 and locks the same to the bracket. The parts are preferably so arranged that the tube 20 is held in a substantially vertical position, although it will be understood that the tube may be inclined in some cases, if desired. The upper end of the tube 20 preferably projects above the sleeve 22 of the bracket and is encircled by the enlarged lower end portion 32 of a conduit 34 leading to a hopper or other source of supply of the workpieces to be fed by the device. The conduit 34 will preferably constitute a flexible metal conduit although any type of conduit found suitable may be employed. If desired, the lower end portion 32 of the conduit 34 may be secured to the tube 20 as by welding, clamping or the like.

A pair of ears 36 are welded or otherwise secured to the tube 20 spaced below the bracket sleeve 22 and extend laterally therefrom in parallel relation, and each thereof is provided with a longitudinal elongated slot 38. The tube is provided with an opening 40 located above the arms 36 and preferably longitudinally elongated and facing and communicating with the space between the two arms 36. As here shown the lower end of the opening 40 terminates between the arms 36, and the upper end thereof is spaced above said arms. In spaced relation below the opening 40 is formed another opening 42 of smaller size and extending in the same radial direction from the center of the tube as the discharge opening 40. The opening 42 is positioned intermediate and spaced from the arms 36 and the bottom end of the tube 20. If desired, another opening 44 may be provided in the tube 20 facing in the same direction as the opening 40 and spaced very slightly above the opening 42 and below the arms 36. At the lower end of the tube an opening or notch 46 is formed which is elongated vertically and extends substantially one-half the circumference of the tube 20 in its lateral dimension. The opening 46 is 90 degrees displaced from the openings 40, 42 and 44 with respect to the center of the tube.

An elongated rigid lever 50 extends alongside and substantially parallel to the tube 20 and is received between the arms 36 to which it is pivoted by a bolt or other member 52 whose shank extends through the elongated slots 38 of said arms. The lever is of a length to project above the arms 36, and at its upper end mounts a screw-threaded bolt or set screw 54 threaded therein and extending perpendicularly therefrom and from the pivot axis defined by the member 52. The member 54 is so positioned that its tip is adapted to enter the elongated opening 40. A lock nut 56 may be mounted upon the set screw 54 to lock the same in selected adjustment. Thus the screw is threaded in the lever, and the lock nut 56 being threaded upon the screw can be drawn to a position frictionally engaging the face of the lever after the screw has been adjusted, thereby preventing release of the member 54 from its selected adjusted position. In spaced relation below the arms 36, the lever arm 50 has secured therein a screw-threaded member 58 whose inner end is adapted to bear against the tube 20 below the arms 36 and above the opening 44, the same providing an abutment to control the normal position of the lever. A lock nut 60 threaded upon the screw 58 holds the same in selected adjustment. Another screw-threaded member 62 is screw-threaded in the lever below the abutment screw 58 and in a position in registration with the opening 42 into which its inner end is adapted to project. A lock nut 64 is preferably mounted upon this screw 62 to hold it in selected adjustment.

A laterally extending arm portion 66 is formed at the lower end of the lever 50, the same being rigid and projecting at a level substantially at the same level as the bottom edge of the tube 20. At its outer end the lateral portion or arm 66 mounts a rigid upwardly projecting arm 68. Intermediate the ends of this arm 68 is pivoted at 70 a plate 72 having a slot 74 substantially concentric with the pivot member 70. A headed screw 76 is screw-threaded in the upwardly projecting arm 68 to pass through the slot 74 and is adapted to be tightened so that its head has a frictional locking engagement with the outer face of the plate 72 to hold the same in selected rotative position relative to the arm 68. The plate 72 has a projection 78 extending downwardly therefrom and to this projection is fixedly secured a member 80, such as a stud or shaft, upon whose lower end is mounted a spherical head 82. The head 82 preferably rotates freely relative to the shaft or stud 80 and is so positioned that it is adapted to engage and ride upon one side edge of the conveyor 10.

The conveyor 10 mounts at a predetermined point along one side edge thereof a plurality of cam members, each of which preferably includes a plate 84 having one or more elongated slots 86 therein within which one or more securing members 88 serving to secure said plate to the conveyor are received. At one end the plate 84 has an enlarged tapered nose portion 90.

The lever 50 has fixedly secured thereto in spaced relation below its pivot 52 and the arm 36 a transversely extending pin 92. The tube 20 has welded or otherwise fixedly secured thereto a similar pin 94 substantially parallel to the pin 92 and located at the side of the tube 20 opposite the lever 50. One or more coil springs 96 are hooked at their opposite ends to the pins 92 and serve as means normally to urge the lever to the position illustrated in Fig. 1 with the screw-threaded abutment member 58 bearing against the tube 20.

The lower end of the tube 20 has an elongated spring clip 98 secured thereto at 100 by a screw or other securing means. The securing means secure the upper end of this spring clip, and the lower end thereof projects downwardly and longitudinally for engagement with a substantially arcuate spring member 102 at its lower end. The spring member 102 extends circumferentially around the tube with the end portion thereof, which is engaged by the clip 98, terminating substantially flush with one vertical edge of the slot or opening 46. The curved spring member 102 is of a length to project partially across the opening 46 at its opposite end 104 which may be seated in a notch or other suitable positioning means interrupting one edge of the opening 46 and which is bent inwardly out of true arcuate form, whereby said portion 104 projects inwardly of the overall outline of the tube 20 and is adapted to engage a work-piece positioned in the lower end of the tube opposite opening 46.

In the use of the device, the tube 20 is selected to be of a diameter to permit the work-pieces to slide freely therethrough by gravity. The work feeding device is positioned with the axis of its tube intersecting the longitudinal line of travel of the chucks or work-gripping members 12 upon the conveyor 10. The lower end of the tube 20 is preferably positioned with only slight clearance above the conveyor. The height or length of the opening 46 is such that when a work-piece within the lower end of the tube bears upon the conveyor at its lower end, the upper end of that work-piece will be at substantially the same or slightly lower level than the top edge of the opening 46. The screws 54 and 62 will be so adjusted that when the parts are in the Fig. 1 position characterized by the engagement of the screw 58 with the tube 20, the member 62 will project into the tube sufficiently to form a barrier to the discharge of work-pieces through the tube, and the member 54 will be positioned with its inner end clear of the work-pieces within the tube. Thereafter, when the cam 90 engages the sphere 82, the lever will be pivoted in a counter-clockwise direction against the action of the spring 96. The movement of the lever by the cam will be so timed that in the operation of the device the release of a work-piece will occur shortly in advance of the movement of one of the chucks 12 past the mouth of the tube. The initial movement of the lever 50 will be a pivotal movement sufficient to urge the member 54 into firm clamping engagement with a work-piece within the tube at the level of the opening 40. It will be understood that the member 62 is so spaced from the member 54 that when the parts are in the Fig. 1 position in which the inner end of the member 62 underlies and forms a barrier to one work-piece, the work-piece next thereabove will be located at the level of the opening 40 and the screw 54. Consequently, initial pivotal movement of the lever 50 will entail a start of the withdrawal of the member 62 from engagement with the lowermost work-piece at the same time that the member 54 is brought into firm frictional engagement with the work-piece above that retained by the member 62. The cam 90 is preferably formed to have such a rise that the pivotal movement of the lever caused thereby will be greater than that necessary to effect frictional engagement of the member 54 with the work-piece opposite thereto and sufficient to permit the member 62 to be withdrawn from its position as a barrier to movement of a work-piece therepast. However, inasmuch as the lever 50 is rigid, and inasmuch as it is desired to assure a frictional engagement of the member 54 with the work-piece before the withdrawal of the member 62 to inoperative position, the parts are arranged to permit the concluding movement of the lever 50 to be a movement fulcrumed about the point of engagement of the member 54 with the work-piece rather than about the pivot member 52. This is accomplished by providing the elongated slot 38 in the arms 36 which permits the bodily movement of the pivot member 52 relative to the arms and against the action of the spring 96 after the member 54 has engaged the work-piece. The releasing position of the parts is best illustrated in Fig. 2 in dotted lines.

The opening 46 at the lower end of the tube faces in the direction in which the conveyor 10 travels, that is, faces away from the feeding station and toward the working station toward which the conveyor is to carry the work-pieces. The cam 90 is so located that sufficient time occurs between the engagement of the sphere 82 with the highest point of the cam 90 and the time when the chuck or work holder moves into register with the tube 20 to provide for the dropping of the work-piece into engagement with the conveyor 10 after release of the member 62. As the work-piece drops by gravity to the lower end of the tube and into engagement with the conveyor 10, it is gripped by the terminal portion 104 of the spring and held thereby against rebound. The lower tip of the work-piece preferably engages the conveyor 10 in advance of the register of the chuck 12 therewith, and the work-piece slides upon the conveyor until the opening of the chuck 10 comes into register with the work-piece. It will be understood that in its open position the chuck will have an opening of larger size than the cross-sectional size of the work-piece so that when the tip of the work-piece no longer is in engagement with the conveyor, but is above the opening of the work holder, the work-piece will fall by gravity into that opening. This necessitates an arrangement where the grip of the spring 104 will not retard the movement of the work-piece by gravity, so that the work-piece will fall quickly into the chuck when the parts are in register. The primary purpose and function of the spring 104 is simply to hold the work-piece against movement through the opening 46 incident to the frictional engagement of its tip with the conveyor 10 until such time as the work-piece is gripped by the chuck. At that time the engagement between the work-piece and the chuck will be sufficiently strong and firm to permit the work-piece to move bodily through the opening 46 by flexing the spring portion 104.

As soon as the sphere 82 passes out of engagement with the cam nose 90, the lever 50 is swung back toward the Fig. 1 position, it being apparent that the initial return movement of that lever will entail a movement fulcrumed about the point of the member 54 until the pivot member 52 reaches the inner end of the elongated slots 38 in the arms 36 or until the screw 58 engages the tube 20. The concluding movement of the lever 50 will thus be a pivotal movement about the member 52 and will insure that the period of time intervening between the point at which the grip of the member 54 is released and the time at which the member 62 assumes its full and operative barrier-forming position, will be very short and less than the time required for the work-piece to fall by gravity from the position in which it is clamped by the member 54 to the position in which its tip engages the member 62.

The device possesses a number of advantages and serves its intended purpose of mechanically feeding a work-piece to each of the chucks 12 upon a conveyor as the latter pass the feeding station. The human element is completely removed and the automatic nature of the device insures that each chuck will carry a work-piece from the feeding station to the working station. In this connection it will be apparent that, if the operator who is manually feeding a machine of this character loses the sense of rhythm necessary to keep up with the machine, or experiences a spell of dizziness, or finds it necessary to grope for work-pieces in a container when the same is only partly filled, a number of chucks will pass to the working station empty. That occurs very frequently in manual feeding machines of this character, but is positively prevented with the instant device. All that is required in the instant device is that the feed hopper of each machine be constantly supplied with the work-pieces, and this can be done easily by unskilled operators, each of whom can attend to a number of machines rather than to only one machine. Where the openings 40 and 42 of the tube are elongated as shown, it is possible to adjust the device for work-pieces of different lengths by simply replacing the lever 50 with another lever whose retaining members 54 and 62 are spaced apart a distance properly calculated for operation with work-pieces of the length to be passed through the machine. The operation of removal of these levers can be performed quickly by simply disengaging one end of each of the springs 96 from the pin 92 and releasing the pivot member 52. It will be understood, however, that each of the levers will operate satisfactorily with work-pieces whose lengths differ through a substantial range. The only requirement in this connection is that the individual work-pieces must not be longer than the spacing between the members 54 and 62, but must be longer than one-half said spacing.

The device is also capable of use with work-pieces of different diameters or cross-sectional dimensions. Adjustments of the machines or pieces of different diameters may entail the necessity of replacing the cam members 90 with other cam members of a size which will provide the necessary throw of the lever. It will not be necessary in each case where a change in the diameter of the work-piece is made to change the cam member, however, inasmuch as the adjustability of the positioning of the members 54 and 62 afforded by their screw-threaded connection with the lever 50 may permit a simple re-setting of those members to change the spacing between their tips or free ends from the innermost surface of the lever 50.

The floating action of the lever enabling the transfer of its fulcrum point, as explained above, is of substantial advantage to insure that the work-pieces will be fed, one by one, with release of a work-piece occurring only after the adjacent work-piece has been effectively gripped.

The adjustment of the cam contactor about its pivot axis 78 provides further adjustment, enabling control of the angle of throw of the release lever, it being understood, of course, that the position of the sphere 80 with reference to the cam 90 must be very carefully calculated with respect to the position of the chuck 12 upon the conveyor and the position of the chuck at the time release of a work-piece occurs.

The location of the opening 46 in the tube facing toward the working station is important. This, coupled with the provision of the spring 104, assures the proper positioning of the work-piece until the chuck moves into register therewith. Additionally, it insures that in the event the proper operation of the device to feed a work-piece into the chuck does not occur, there will be no jamming of the parts which would cause damage, injury or breakage of either the machine or the feeding device. In other words, if a work-piece is jammed and does not properly fall into one of the chucks but only partially feeds therein so that the work-piece does not assume a proper operative position, it, nevertheless, may be released from the feeding device without damage thereto and then will be permitted to fall freely upon the conveyor from which it can roll before it reaches a work station without interfering with the working tool. Adjustment of the curved spring 102, 104 may be desired and, as such adjustment is found necessary, it can be effected very simply by shifting that spring in a circumferential direction or manner to either increase or decrease the extent of projection of the portion 104 thereof beyond the adjacent longitudinal edge of the opening 46.

While the preferred embodiment of the invention has been illustrated and described herein, it will be understood that changes in the construction may be made within the scope of the appended claims without departing from the spirit of the invention.

I claim:

1. A work feed device comprising an elongated substantially upright tubular member having a pair of longitudinally spaced openings, a lateral projection on said tube between said openings and having a substantially horizontal elongated slot, a rigid upright lever, a pivot carried by said lever and slidable in said slot, a spring connecting said lever and tubular member to normally urge said lever to a predetermined operative position, a pin extending laterally from said lever in register with said lower opening and projecting into said tubular member to form a stop therein, and a second pin extending laterally from said lever in register with the other opening, and means for swinging said lever to first effect clamping engagement of said second pin with the work-piece in said tubular member next above the work-piece engaging said first pin and to thence move said first pin clear of the work-piece engaged thereby.

2. A device of the construction defined in claim 1, and an abutment on said lever engageable with said tubular member to define said normal operative position.

3. A device of the construction defined in claim 1, and an abutment on said lever engageable with said tubular member to define said normal operative position, said pins and said abutment each being adjustable transversely of said lever.

4. A device for feeding work pieces to a machine having a conveyor mounting a plurality of work holders traveling in a predetermined path, comprising an upright tubular member adapted to be positioned above said path, means for delivering work pieces to the upper end of said tubular member, said tubular member having a side delivery opening at its lower end facing in the direction of movement of said work holders and a pair of longitudinally spaced openings spaced above said delivery opening, a control unit shiftably carried by said tubular member between said last named openings and including a contactor engageable with said conveyor and a pair of stop members each adapted to project through one of said longitudinally spaced openings, said control unit having two operative positions, one of said stop members engaging a work piece in one of said operative positions and the other stop member engaging a work piece in the other operative position, said control unit having a pin and slot connection with said tubular member, and a spring member normally urging said control unit to one operative position with said pin at one end of said slot, said unit being shiftable against said spring in a movement entailing initial pivoting thereof to effect engagement of the normally inoperative stop member with a work piece and subsequent swinging movement fulcrumed at the point of said engagement and accommodated by said slot.

5. A device for feeding work pieces to a machine having a conveyor mounting a plurality of work holders traveling in a predetermined path, comprising an upright tubular member adapted to be positioned above said path, means for delivering work pieces to the upper end of said tubular member, said tubular member having a side delivery opening at its lower end facing in the direction of movement of said work holders and a pair of longitudinally spaced openings spaced above said delivery opening, a control unit shiftably carried by said tubular member between said last named openings and including a contactor engageable with said conveyor and a pair of stop members each adapted to project through one of said longitudinally spaced openings, said control unit having two operative positions, one of said stop members engaging a work piece in one of said operative positions and the other stop member engaging a work piece in the other operative position, a curved resilient member encircling the portion of said tube interrupted by said delivery opening, and a clamp carried by said tube and engaging and positioning said resilient member, one end of said resilient member spaced from said clamp projecting partly across said opening and extending through said opening for engagement with a work piece.

ELMER J. TUTTLE.

REFERENCES CITED

The following references are of record in the file of this patent:

UNITED STATES PATENTS

| Number | Name | Date |
| --- | --- | --- |
| 945,658 | Wight | Jan. 4, 1910 |
| 1,275,581 | Macomber | Aug. 13, 1918 |
| 2,246,675 | Gronemeyer | June 24, 1941 |
| 2,336,676 | Erickson et al. | Dec. 14, 1943 |